United States Patent
Worrel

(10) Patent No.: US 6,378,636 B1
(45) Date of Patent: Apr. 30, 2002

(54) METHOD AND SYSTEM FOR PROVIDING FOR VEHICLE DRIVABILITY FEEL AFTER ACCELERATOR RELEASE IN AN ELECTRIC OR HYBRID ELECTRIC VEHICLE

(75) Inventor: Peter Francis Worrel, Troy, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/686,454

(22) Filed: Oct. 11, 2000

(51) Int. Cl.[7] .................................................. B60K 1/00
(52) U.S. Cl. ........................ 180/65.2; 180/65.4; 701/22
(58) Field of Search ................................ 180/165, 65.1, 180/65.2, 65.3, 65.4, 65.6, 65.8; 701/22

(56) References Cited

U.S. PATENT DOCUMENTS

| | | | |
|---|---|---|---|
| 4,103,211 A | | 7/1978 | Gardner et al. |
| 4,691,148 A | | 9/1987 | Nicholls et al. |
| 5,291,960 A | * | 3/1994 | Brandenburg et al. ..... 180/65.2 |
| 5,511,859 A | | 4/1996 | Kade et al. |
| 5,578,911 A | | 11/1996 | Carter et al. |
| 5,615,933 A | | 4/1997 | Kidston et al. |
| 5,669,679 A | | 9/1997 | Hammond et al. |
| 5,713,425 A | * | 2/1998 | Buschhaus et al. ......... 180/65.2 |
| 5,722,502 A | * | 3/1998 | Kubo ........................ 180/65.4 |
| 5,771,476 A | * | 6/1998 | Mufford et al. ............ 180/65.1 |
| 5,853,229 A | | 12/1998 | Willmann et al. |
| 6,013,992 A | * | 1/2000 | Ishikawa et al. ........... 180/65.2 |
| 6,019,183 A | * | 2/2000 | Shimasaki et al. ......... 180/65.2 |
| 6,019,699 A | * | 2/2000 | Hoshiya et al. ............... 477/20 |
| 6,158,822 A | | 12/2000 | Shirai |
| 6,176,556 B1 | | 1/2001 | Kizer et al. |
| 6,186,253 B1 | | 2/2001 | Barnhart et al. |
| 6,209,672 B1 | * | 4/2001 | Severinsky ................. 180/65.2 |

OTHER PUBLICATIONS

Entitled: Comparison of Control Methods for Electric Vehicle Antilock Braking/Traction Control System, Authored by: P.Khatun, C. Bingham, P. Mellor, Published by: Society of Automotive Engineers, Dated: Mar. 5–8, 2001.

* cited by examiner

Primary Examiner—Paul N. Dickson
Assistant Examiner—Mariano Sy
(74) Attorney, Agent, or Firm—Carlos L. Hanze

(57) ABSTRACT

The invention is a method and system to provide negative torque to an electric vehicle (EV, FCEV, hybrid electric powertrain (HEV)) powertrain when only the electric motor is engaged and the accelerator pedal is released with the ultimate objective to provide consistent vehicle performance under varying operating conditions. This deceleration is at a calibratable amount for a calibratable time period using a hierarchical strategy employing a variety of means including dissipating the vehicle's kinetic energy as heat in the motor; regenerative braking; and activating a mechanical braking system. This negative torque on the powertrain is provided only briefly thereby reducing the total kinetic energy dissipation. The invention provides the driver a vehicle deceleration response similar in "feel" to releasing the accelerator of a conventional ICE vehicle under all operating modes, while maintaining optimal energy recovery.

13 Claims, 2 Drawing Sheets

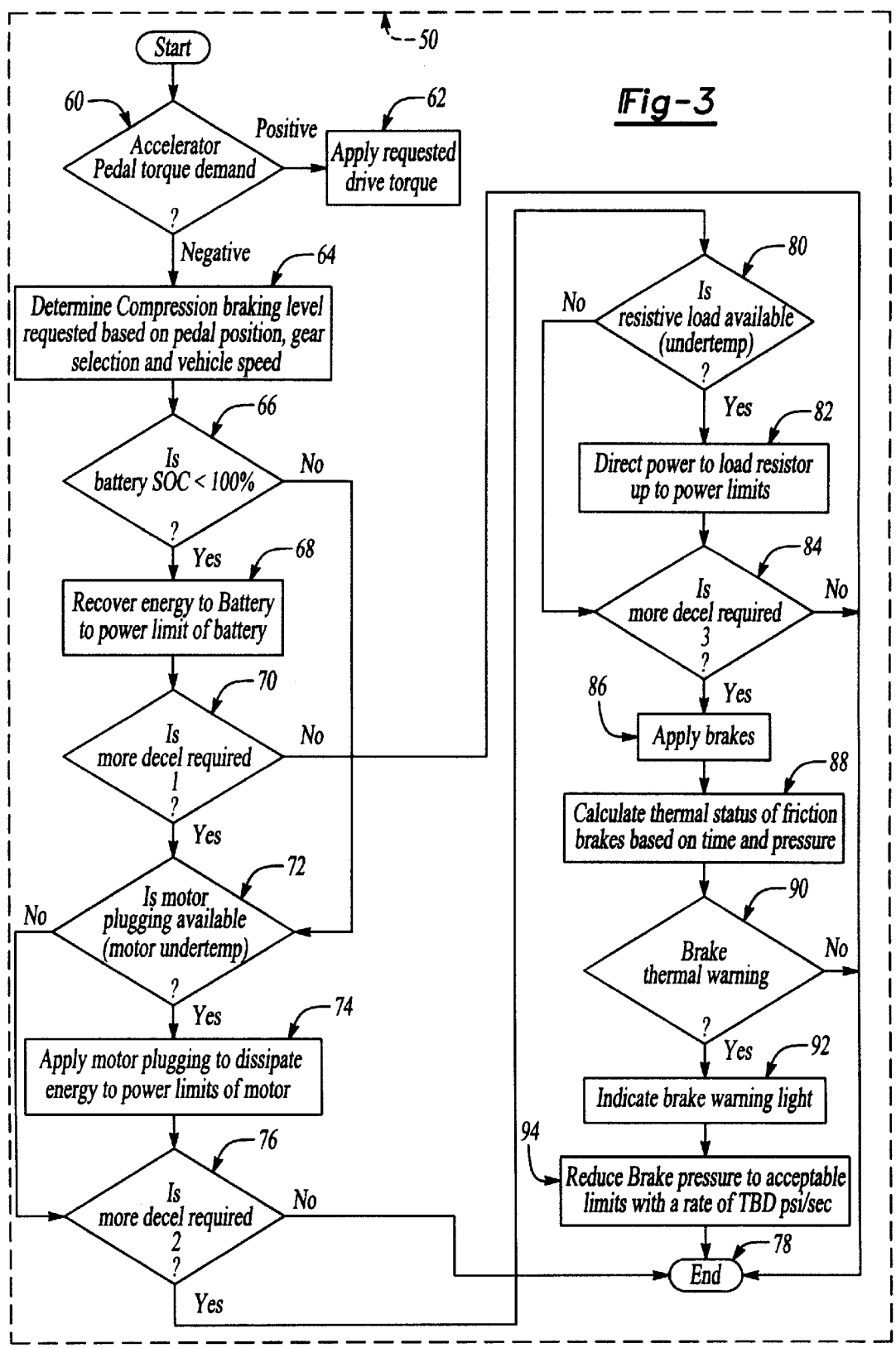

METHOD AND SYSTEM FOR PROVIDING FOR VEHICLE DRIVABILITY FEEL AFTER ACCELERATOR RELEASE IN AN ELECTRIC OR HYBRID ELECTRIC VEHICLE

BACKGROUND OF THE INVENTION

1. Field of Invention

The present invention relates generally to an electric vehicle (EV), hybrid EV (HEV) or fuel cell EV (FCEV), and specifically to a hierarchical method and system for an EV, HEV, or FCEV to simulate the negative powertrain torque (deceleration force) of a traditional internal combustion engine vehicle when the accelerator pedal is released and only the electric motor is providing torque to the powertrain.

2. Discussion of the Prior Art

The need to reduce fossil fuel consumption by and pollutants from automobiles and other vehicles powered by an internal combustion engine (ICE) is well known. Vehicles powered by electric motors attempt to address these needs. However, electric vehicles have limited range and limited power capabilities and need substantial time to recharge their batteries. An alternative solution is to combine both an ICE and electric traction motor into one vehicle. Such vehicles are typically called hybrid electric vehicles (HEV's). See generally, U.S. Pat. No. 5,343,970 (Severinsky).

The HEV has been described in a variety of configurations. Many HEV patents disclose systems where an operator is required to select between electric and internal combustion operation. In other configurations, the electric motor drives one set of wheels and the ICE drives a different set.

Other, more useful, configurations have developed. For example, a series hybrid electric vehicle (SHEV) is a vehicle with an engine (most typically an ICE) that powers a generator. The generator, in turn, provides electricity for a battery and an electric traction motor coupled to the drive wheels of the vehicle. There is no mechanical connection between the engine and the drive wheels. Further, a parallel hybrid electrical vehicle (PHEV) is a vehicle with an engine (most typically an ICE), battery, and electric traction motor that combine to provide torque to the drive wheels of the vehicle.

A parallel/series hybrid electric vehicle (PSHEV) has characteristics of both the PHEV and the SHEV. The PSHEV is also known as a torque (or power) split powertrain configuration. Here, the engine torque can be used to power a generator and/or contribute to the necessary wheel or output shaft torque. Further, the PSHEV reduces emissions and fuel consumption under certain conditions by turning the engine off. The PSHEV can be used to generate electricity to the battery or can contribute to the necessary wheel or output shaft torque. The traction motor is used to contribute to the necessary wheel or output shaft torque and can also be used to recover braking energy to the battery if a regenerative braking system is used.

The desirability of combining the ICE with an electric motor is clear. The ICE's fuel consumption and pollutants are reduced with no appreciable loss of performance or range of the vehicle. Nevertheless, there remains substantial room for development of ways to optimize HEV operation.

One such area of development is the improvement of the overall HEV drive-ability and feel consistent with traditional ICE vehicles. This is especially true when the HEV's engine is not contributing torque to the vehicle's powertrain or is not even running. When the electric motor is solely providing powertrain torque, there is very little or no drag on the powertrain after the driver releases a speed control such as an accelerator pedal. Typically, the driver of a traditional ICE vehicle expects a coast-down force in vehicle speed when the accelerator pedal is released because of the effect of engine braking.

Engine braking is well known and is typically characterized by two types of negative powertrain torque including engine friction and pumping (compression) losses. Engine friction loss occurs during engine braking because the engine, although unfueled, is still connected to the powertrain. Engine pumping loss refers to the compression of air in each engine cylinder as it moves through its stroke. Engine braking is expected by the driver and allows reduction of vehicle speed without applying force to the brake pedal.

Various ways for an electric vehicle to simulate the ICE's negative torque when the accelerator is released are known in the prior art. Gardner, et. al., U.S. Pat. No. 4,103,211 (1978) describes a system of providing a motor armature regenerative current path through a load resistor by maintaining motor field current when the speed control is released. The resistance element serves to limit the magnitude of the current produced by the armature and provide a power sink or load to absorb the regenerative energy. Thus, the combination of a function generator, a diode, and a resistance element acts to provide the expected negative powertrain torque. The Gardner invention also discloses that the system could be adapted for bidirectional motion (i.e., forward and reverse) by, for example, switches for reversing the motor field winding connections.

Regenerative braking (regen) causes vehicle coast-down by capturing the kinetic energy of the vehicle. In conventional vehicles, kinetic energy is usually dissipated as heat at the vehicle's brakes or engine during deceleration. Regen converts the captured kinetic energy, through a generator, into electrical energy in the form of a stored charge in the vehicle's battery. Consequently, regen also reduces fuel usage and emission production.

In Nicholls, et. al., U.S. Pat. No. 4,691,148 (1987), a control circuit for electric vehicles is described that includes applying regen during coasting and braking. The regen is switched on by releasing the accelerator or slightly engaging the brake pedal. Mechanical brakes are added when additional brake pedal force is applied. During this regenerative braking, the circuit between the battery pack and the motor must remain connected even though the accelerator pedal is released. Normally, the battery pack would be disconnected from the motor. The control circuit is calibrated to reduce speed gradually using regen when brake pedal braking is not desired.

Carter, et. al., U.S. Pat. No. 5,578,911 (1996, Chrysler Corporation), describes a continuously variable regenerative control for an electric vehicle. The control provides the ability to tailor the regenerative (or braking) effect of the electric motor to match that of the internal combustion engine. This drivability characteristic is familiar to and desired by many vehicle operators.

Although the desire and need for drivability feel when the accelerator is released is known, to some extent, for a solely electric vehicle, there is a need to develop a more sophisticated method and system for a consistent coast-down feel including all electric powertrain applications.

SUMMARY OF THE INVENTION

Accordingly, it is an object of this invention to provide a method and system for an EV, FCEV or HEV to provide a negative torque to a powertrain with an electric motor, comprising: an operator movable accelerator through a range of distance from a rest position to a full power position; a means to transmit when the accelerator is released to a vehicle system controller (VSC) ; a means to transmit to the VSC when the electric motor is a sole source of torque to the powertrain; a control module within the VSC to determine that both the accelerator is released and the electric motor is solely providing torque to the powertrain; and a coast-down strategy that receives the output of the control module and commands negative torque to the powertrain when the control module has determined the accelerator is released and the electric motor is the sole torque provider to the powertrain.

Another object of the invention provides negative powertrain torque in a manner calibrated in amount and duration to the amount of vehicle deceleration expected or desired by the driver of a traditional internal combustion engine (ICE) vehicle when the accelerator pedal is released.

It is a further object of this invention to maximize energy recovery using regenerative braking (regen) in a vehicle with an electric motor powertrain while maintaining a consistent and expected deceleration.

Deceleration can occur using a variety of negative powertrain torque strategies including the following: dissipating the kinetic energy of the vehicle as heat in the electric motor ("plugging"); adding a resistive load to the powertrain, whereby deceleration occurs from controlling the motor as a generator and generating electrical power to store in a battery; and activating mechanical brakes, whereby the vehicle's kinetic energy is dissipated as heat in brake rotors and drums.

It is a further object of this invention to provide a method and system that will select the appropriate method of energy dissipation based on vehicle operating conditions such as battery state of charge, engine/motor temperature, resistive load temperature, such that deceleration is it consistent regardless of operating conditions. The system configuration may contain some or all of strategies. It should also be understood that additional methods could be utilized as an obvious extension of this logic.

BRIEF SUMMARY OF THE FIGURES.

FIG. 3 illustrates a possible decision flow strategy for coast-down when the accelerator is released and the electric motor is solely providing torque to the vehicle powertrain.

DETAILED DESCRIPTION OF PREFERRED EMBODIMENT

The present invention generally relates to electric vehicles EVs, hybrid EVs (HEVs), fuel cell EVs (FCEVs). The present invention provides not only a strategy to simulate the feel of a traditional internal combustion engine vehicle, but also a coordinated strategy to optimize energy recovery/fuel economy. Although the preferred embodiment described is for a parallel HEV, the invention could be applied to any vehicle using an electric motor or a vehicle combining an electric motor and an internal combustion engine (ICE) as the powertrain source having an engine disconnect clutch.

Figure 1:
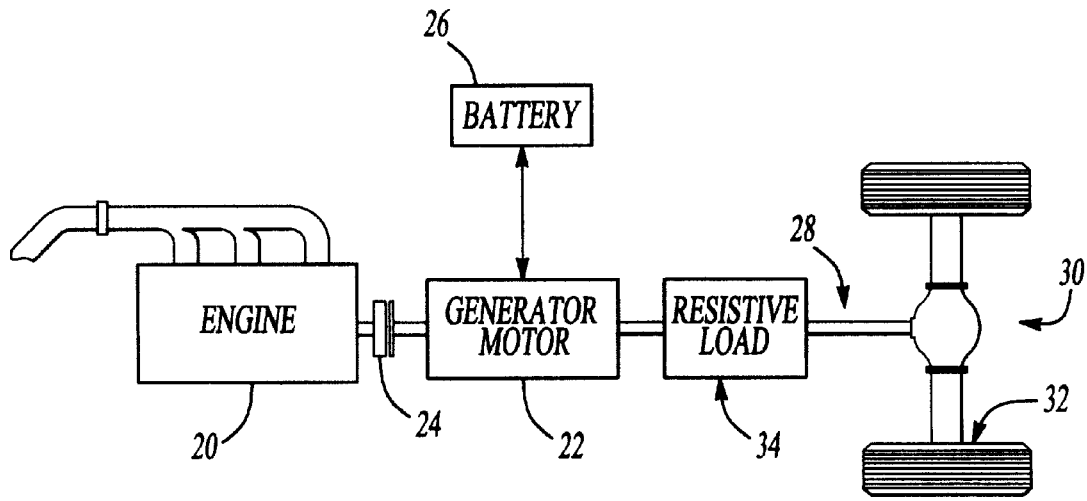
FIG. 1 illustrates the general components of a hybrid electric vehicle (HEV) powertrain with an engine disconnect clutch.

FIG. 1 shows general components of a parallel HEV powertrain with an engine disconnect clutch. An engine 20 is linked to an electric motor/generator 22 via a disconnect clutch 24. A battery 26 connects to the motor/generator 22 and allows the flow of electrical current to and from the two components. The motor/generator 22 is connected to a power transfer means 28, such as a drive shaft, which is connected a vehicle's wheels 30. Thus, torque energy flows from the engine 20 and motor/generator 22 through the power transfer means 28 to the wheels 30. A resistive load 34 is also attached to the power transfer means. The wheels 30 have mechanical brakes 32 to stop the vehicle as desired by an operator. Since the engine 20 can be disconnected from the motor/generator 22 and the power transfer means 28, there are three potential powertrain states. These states are based on various vehicle demands and include the engine only, the motor only, or the engine and the motor combined.

Figure 2:
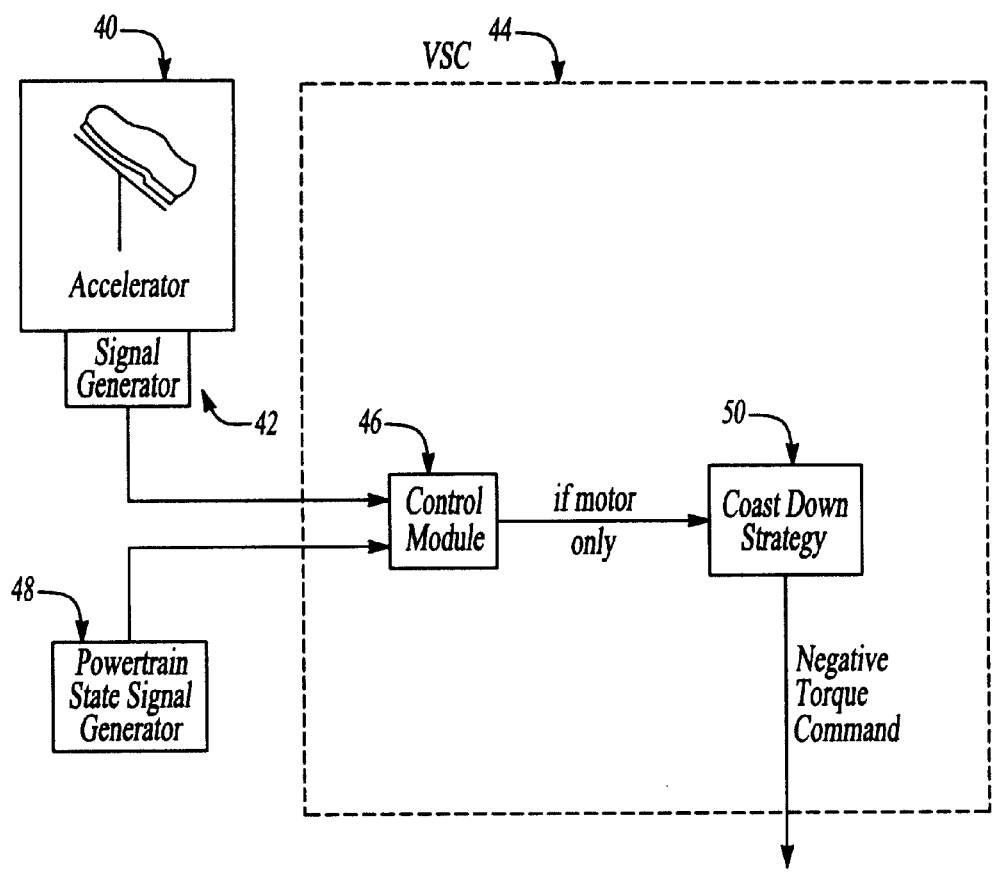
FIG. 2 illustrates the major components of the HEV's vehicle system controller for providing negative torque (coast-down) when the accelerator is released and the electric motor is solely providing torque to the vehicle powertrain.

The preferred embodiment of this invention occurs when only the motor is connected to the power transfer means 28. In FIG. 2, a general illustration of a possible strategy to determine an expected vehicle deceleration (coast-down) response feel in this powertrain state, similar to a conventional ICE vehicle when the accelerator pedal is released, is shown. An accelerator 40 has an accelerator signal generator 42. Within a vehicle system controller (VSC) 44, a control module 46 receives input from the accelerator signal generator 42 and a powertrain state signal generator 48. If the control module 46 determines the accelerator 40 is released and the engine 20 is disconnected from the power transfer means 28, a command is sent to run a coast-down strategy 50.

Many types of coast-down strategy 50 configurations are possible and the three described below are not meant to limit the use of the present invention. Each coast-down strategy 50 must be immediate and provided for only a brief time, thereby reducing the total energy dissipation but still providing expected vehicle response feel to the driver. Further, each strategy must maximize energy recovery regenerative braking (regen) while maintaining a consistent and expected deceleration.

Generally, the strategy will select the appropriate coast-down strategy based on vehicle operating conditions such as battery state of charge, engine/motor temperature, resistive load temperature, such that deceleration is consistent regardless of operating conditions. The system configuration may contain some or all of strategies.

A first strategy involves "motor plugging." Motor plugging provides negative torque to the powertrain by dissipating the kinetic energy of the vehicle as heat in the motor/generator 22 as described in the prior art. This strategy involves operating the motor inefficiently. The controller is essentially causing the motor to burn power by using high flux levels in the motor windings.

A second strategy could include adding a resistive load to the powertrain by controlling the motor/generator 22 as a generator. In this strategy, electrical power is generated to a resistive load that dissipates the energy or to the battery 26 to store the energy.

A third strategy would activate the mechanical brakes 32 that would dissipate the vehicle's kinetic energy as heat in the brake rotors and drums.

The preferred coast-down strategy 50 configuration combines all three strategies described above and is illustrated in FIG. 3. The strategy flow shows the decision process and priority sequence to select the appropriate function to allow consistent deceleration feel.

First, an accelerator pedal torque demand 60 is determined from the accelerator 40 position. Positive torque demand results in an apply requested drive torque 62 command. Negative torque demand results in a determination of compression braking level 64 that determines amount of compression braking based on the accelerator 40 position, gear selection (i.e., PRNDL) and vehicle speed.

Since the coast-down strategy 50 optimally is intended to recover the energy, the battery 26 is selected to store the energy. Therefore, once compression braking level 64 is determined, the battery state-of-charge (SOC) 66 is determined. If a battery SOC 66 is at <100 per-cent, a recover energy to battery 68 command results, whereby the system seeks to recover as much kinetic energy to the battery 26 to a power limit of the battery 26. If the battery SOC 66 is at 100%, the procedure is to dissipate the energy directly in the motor/generator 22 up to its available limits.

If the recover energy to battery 68 command results in reaching the power limit of the battery 26, a first determination of the need for more deceleration 70 results. If no more deceleration is required, an end strategy 78 results. If more deceleration is needed, a motor plugging availability determination 72 is made based on motor/generator 22 temperature compared against a predetermined threshold. If motor plugging is available (i.e., the motor/generator 22 is under the temperature threshold), a motor plugging command 74 is applied to dissipate energy to the power limits of the motor/generator 22. Once the power limits of the motor/generator 22 are reached, a second determination of a need for more deceleration 76 is made. This second determination of the need for more deceleration 76 also receives the output of the motor plugging availability determination 72 when the motor/generator 22 is over the threshold temperature.

If the second determination of the need for more deceleration 76 is no, the end strategy 78 results. If the second determination of the need for more deceleration 76 is yes, a resistive load determination 80 is made, whereby the determination of a temperature of the resistive load 34 is compared against a predetermined threshold value.

If the resistive load 34 is available, a command to direct power to a resistive load 82 results up to the power limits of the resistive load 34. Once the power limits of the resistive load 34 are reached, a third determination of the need for more deceleration 84 is made. This third determination 84 also receives the output of the resistive load availability determination 82 when the resistive load 34 is over the threshold temperature.

If no more deceleration is required after this third determination 84, the strategy goes to the end strategy 78. If more deceleration is required after this third determination 84, the strategy goes to an apply brake 86 command, whereby the mechanical brakes 32 are applied.

As the mechanical brakes 32 are applied, the strategy makes a calculation of thermal status of the mechanical brakes 88, whereby the status of the brakes 32 are calculated based on braking duration and pressure. This calculation results in a brake thermal warning determination 90 based on a predetermined threshold.

If the thermal brake warning 90 is no, the end strategy 78 results. If the thermal brake warning 90 is yes, a brake warning light 92 is activated, followed by a reduction of brake pressure command 94, whereby brake 32 pressure is reduced to predetermined acceptable limits and ultimately to the end of the strategy 78.

This preferred embodiment has various modifications, variations and improvements that will occur to those skilled in the art, and all these that these that come within the true spirit and scope of the invention are included within the scope of the following claims.

I claim:

1. A control system for a vehicle to provide a negative torque to a powertrain with an electric motor, comprising:
   an accelerator means that is operator-movable through a range of positions from a released position to a full power position;
   a means to transmit accelerator means position to a vehicle system control when the accelerator means is at the released position;
   a means to transmit a powertrain state to the vehicle system control;
   a control module within the vehicle system control to receive an output from the means to transmit accelerator position and an output from the means to transmit the powertrain state, wherein the control module determines when the accelerator means is at the released position and the electric motor is the sole source of torque to the powertrain; and
   a hierarchical coast-down strategy means that receives the output from the control module and commands a negative torque means, based on a plurality of vehicle operating conditions, to the vehicle powertrain through a plurality of methods of supplying negative torque when the control module has determined the accelerator is released and the electric motor is the sole torque provider to the powertrain so that the negative torque means maintains optimal energy recovery and deceleration is consistent regardless of the plurality of vehicle operating conditions.

2. The control system for the vehicle of claim 1, wherein the vehicle is an electric vehicle.

3. The control system for the vehicle of claim 1, wherein the vehicle is a hybrid electric vehicle.

4. The control system for the vehicle of claim 1, wherein the vehicle is a fuel cell electric vehicle.

5. The control system for the vehicle of claim 1, wherein the coast-down strategy means provides negative torque to the powertrain in a manner calibrated in amount and duration to the negative torque expected by a driver of a traditional internal combustion engine based vehicle when an engine accelerator pedal is released.

6. The control system for the vehicle of claim 1, wherein the negative torque means comprises:
   negative torque applied to the vehicle powertrain by dissipating the kinetic energy of the vehicle as heat in the electric motor;
   negative torque applied to the Vehicle powertrain by adding a resistive load to the powertrain so that deceleration occurs from the electric motor, controlled as a generator, by generating electrical power to the resistive load to dissipate energy or to a battery to store energy; and
   negative torque applied to the vehicle powertrain by activating mechanical brakes so that the vehicle kinetic energy is dissipated as heat in brake rotors or drums.

7. The control system for the vehicle of claim 1, wherein the plurality of vehicle operating conditions comprises:
   battery state of charge;
   engine temperature;
   motor temperature; and
   resistive load temperature.

8. A method to provide a negative torque to a powertrain of a vehicle with an electric motor, comprising the steps of:

releasing an operator-movable accelerating means through a range of positions from a released position to a full power position;

transmitting accelerator means position to a vehicle system control when the accelerator means is at the released position;

transmitting a powertrain state to the vehicle system control;

determining when the electric motor is a sole source of torque to the powertrain and the accelerator means is at the released position;

commanding a coast-down strategy, based on a plurality of vehicle operating conditions so that negative torque is applied to the vehicle powertrain; maintaining optimal energy recovery; and maintaining consistent deceleration regardless of the plurality of vehicle operating conditions.

9. The method of claim 8, wherein the vehicle is an electric vehicle.

10. The method of claim 8, wherein the vehicle is a hybrid electric vehicle.

11. The method of claim 8, wherein the vehicle is a fuel cell electric vehicle.

12. The method of claim 8, wherein the commanding a coast-down strategy step further comprises the steps of:

calibrating the negative torgue to the powertrain in an amount and duration equal to the negative torque expected by a driver of a traditional internal combustion engine based vehicle when an engine accelerator pedal is released;

dissipating the kinetic energy of the vehicle as heat in the electric motor;

adding a resistive load to the powertrain by controlling the electric motor as a generator and generating electrical power to the resistive load to dissipate energy or to a battery to store the energy; and activating mechanical brakes so that the vehicle's kinetic energy is dissipated as heat in brake rotors and drums.

13. The method of claim 8, wherein the plurality of vehicle operating conditions comprises:

battery state of charge;

engine temperature;

motor temperature; and resistive load temperature.

* * * * *